9894X
I. Snider.
Plow Moldboard.
Patented Jul. 2, 1836.
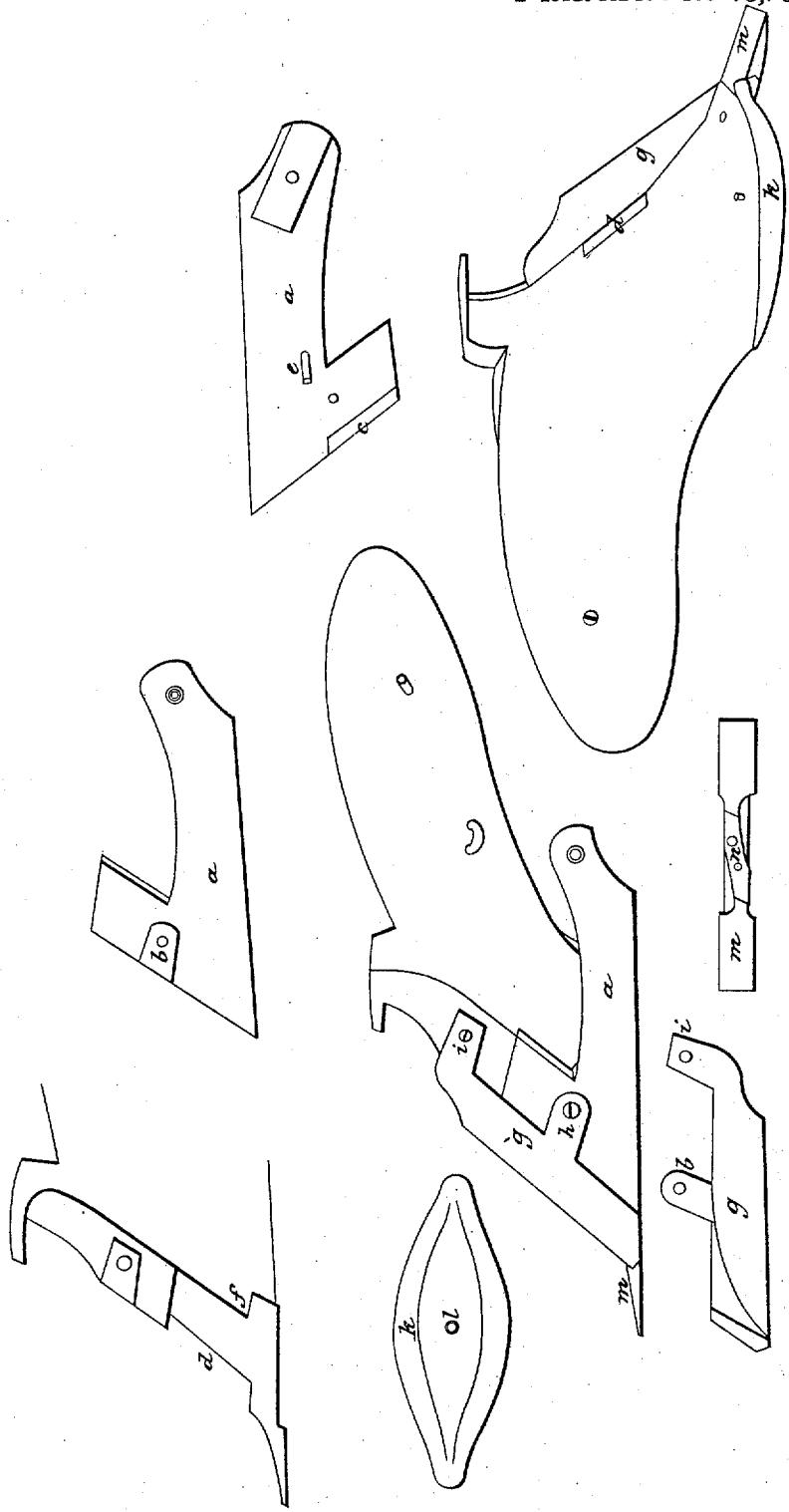
H. PETERS, PHOTO-LITHOGRAPHER, WASHINGTON, D. C.

July 2 1836

9894X Isaac Snider, of Mount Pleasant, Penn^a.
Letters Patent

The schedule referred to in these Letters Patent, and making part of the same containing a description in the words of the said Isaac Snider himself, of his improvement in the Plough"—

---

Be it known that I Isaac Snider, of Mount Pleasant, in the County of Westmoreland & State of Pennsylvania, have made a new and useful improvement in the Plough which is described as follows, reference being had to the annexed drawings of the same making part of this specification.—
This improvement consists in casting the land side a in the manner represented in the drawing, with a cavity or recess b to admit a projection from the cutter; the fore part of this land side being cast with a projection c in the form of a hook for hooking over the front of the mould board at d to secure it; and also another projection e to hook over the projecting part of the mould board at f. The cutter g. is cast with two projections h. i to fit into corresponding cavities in the mould board and land side; the side towards the land is made straight and that towards the furrow is curved so as to continue the curve of the mould board & to fit it close; its lower end rests in a cavity in the point or nose hereafter described — — -
Two screws pass through the projections of the cutter & through the mould board by which the cutter is secured. The shear k is cast of an oval shape with a sharp edge all around having a shallow depression in the centre for the lower edge of the mould board to rest in and a round aperture l. to admit a screw bolt which secures it to the mould board; its peculiar shape allows of its being turned four times as its edges wear away or become dull — -
The fore part rests in a cavity in the side of the nose or point. The point or nose m of the plough consists of a bar of iron shaped like a wedge at each end having cavities in its sides, top and bottom, to admit the points of the cutter, shear & mould board, and a round aperture n. for a screw bolt which secures it to the mould board in front; it can be reversed or changed in position four times as its points wear — — —

198. 9894X

The mould board does not differ from others in use except in the shape of its lower edge which fits the depression in the shear being made to correspond in shape thereto, & also in the cavities to admit the projection of the cutter & the land side – The beam and handles are similar to others in use

What I claim as my invention & which I desire to secure by Letters patent consists in the improvements in the land side, cutter, shear & point as before described enabling the farmers to change or reverse the position of the nose & shear four times & producing a new cutting edge each time.

Witnesses
Wm P. Elliot
Peter Callan

Isaac Snider

[illegible]

Drawing

[illegible]